United States Patent [19]

Ikegami et al.

[11] Patent Number: 5,270,960
[45] Date of Patent: Dec. 14, 1993

[54] TEMPERATURE COMPENSATION DEVICE FOR AN ANGULAR VELOCITY SENSOR

[75] Inventors: Masayuki Ikegami; Fumitaka Takahashi; Akira Iiboshi; Tomoyuki Nishio; Sinichi Tomiyama; Hirotatsu Tsuchida; Ryoichi Tsuchiya, all of Saitama, Japan

[73] Assignee: Honda Giken Kogyo Kabushiki Kaisha, Tokyo, Japan

[21] Appl. No.: 661,547

[22] Filed: Feb. 26, 1991

[30] Foreign Application Priority Data

Mar. 8, 1990 [JP] Japan ................................. 2-57553

[51] Int. Cl.[5] ............................................ G01D 18/00
[52] U.S. Cl. ............................ 364/571.03; 73/861.03
[58] Field of Search ............ 73/1 E, 3, 861.01, 861.02, 73/861.03, 204.16, 204.17; 364/424.01, 424.05, 443, 447, 556, 557, 571.01, 571.02, 571.03, 571.04, 571.05, 571.07

[56] References Cited

U.S. PATENT DOCUMENTS

| | | | |
|---|---|---|---|
| 4,031,630 | 6/1977 | Fowler | 73/1 E |
| 4,571,991 | 2/1986 | Abe et al. | 73/204.16 X |
| 4,817,022 | 3/1989 | Jornod et al. | 73/861.01 X |
| 4,930,095 | 5/1990 | Yuchi et al. | 364/571.01 |
| 5,065,612 | 11/1991 | Ooka et al. | 364/571.02 X |

Primary Examiner—Jack B. Harvey
Assistant Examiner—Edward Pipala
Attorney, Agent, or Firm—Lyon & Lyon

[57] ABSTRACT

An angular velocity sensor wherein an internal temperature of the sensor body is sensed by a temperature sensor and adjusted to be equal to a preset value; an offset value is obtained from an output of the angular velocity sensor at the preset internal temperature with no angular velocity acting thereon and an angular velocity signal at the preset internal temperature is compensated for by the obtained offset value; and also an angular velocity detection signal obtained before the internal temperature reaches the preset value is compensated for by an offset value determined on the base of a value readout from a memory table storing therein characteristic offset values varying with the internal temperature of the sensor body.

7 Claims, 5 Drawing Sheets

TEMPERATURE COMPENSATION DEVICE FOR AN ANGULAR VELOCITY SENSOR

BACKGROUND OF THE INVENTION

The present invention relates to an angular velocity sensor which is capable of sensing an angular velocity acting on the sensor body to generate an electrical detection signal.

Generally, two types of angular velocity sensors are used: a gas flow type which is intended to detect a deflection of gas flow by the use of a temperature sensing element when an angular velocity acts on the sensor body, and a piezoelectric type which is intended to sense a change in resonant frequency of a pair of piezoelectric elements. Both the temperature sensing element and piezoelectric element may have varying characteristics with temperature and time causing an error in angular velocity measurement.

As a result, even with no rotational motion being applied to the sensor body an error output may be produced due to a deviation of characteristics of paired temperature sensing elements or piezoelectric elements.

In the prior art, since the offset output varies depending upon a change of the internal temperature of the angular velocity sensor, the sensor body is forcibly heated in such a way that its internal temperature detectable by the temperature sensing element may be constantly kept at the preset value.

Thus an angular velocity detection signal is compensated for a value corresponding to the offset caused at the preset temperature.

However, this technique of controlling the temperature by heating the sensor body by the use of a heater is disadvantageous as the compensation of the angular velocity detection signal can not be performed during the time interval necessary to raise the internal temperature of the sensor body to the preset value.

SUMMARY OF THE INVENTION

The present invention is directed to an angular velocity sensor which is capable of performing the offset compensation of an angular velocity detection signal immediately from the beginning of heating of the sensor body.

An angular velocity sensor includes a table containing a series of preset temperature-related offsets. As the sensor body temperature rises, the table reads out a series of offset valves corresponding to the rising sensor body temperature, to compensate angular velocity detection signals for the corresponding offset valves.

The present invention also provides an angular velocity sensor capable of constantly obtaining an optimum offset valve to be used for compensation of the angular detection signal, including compensation for variation of offset valves with aging of the sensor.

DESCRIPTION OF THE PREFERRED EMBODIMENTS

Figure 1:
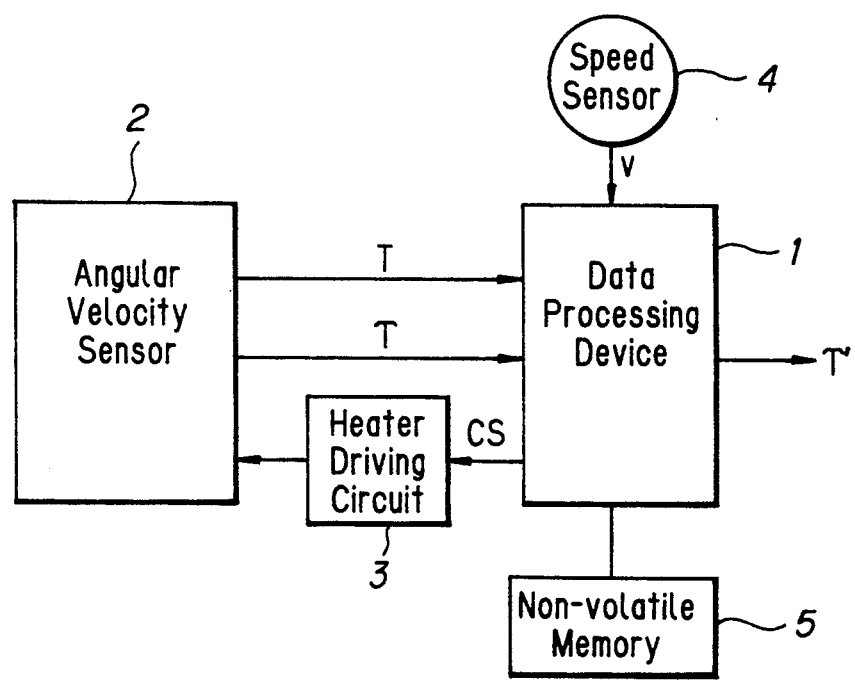
FIG. 1 is a block diagram showing a practical construction of an angular velocity sensor embodying the present invention.
Figure 2:
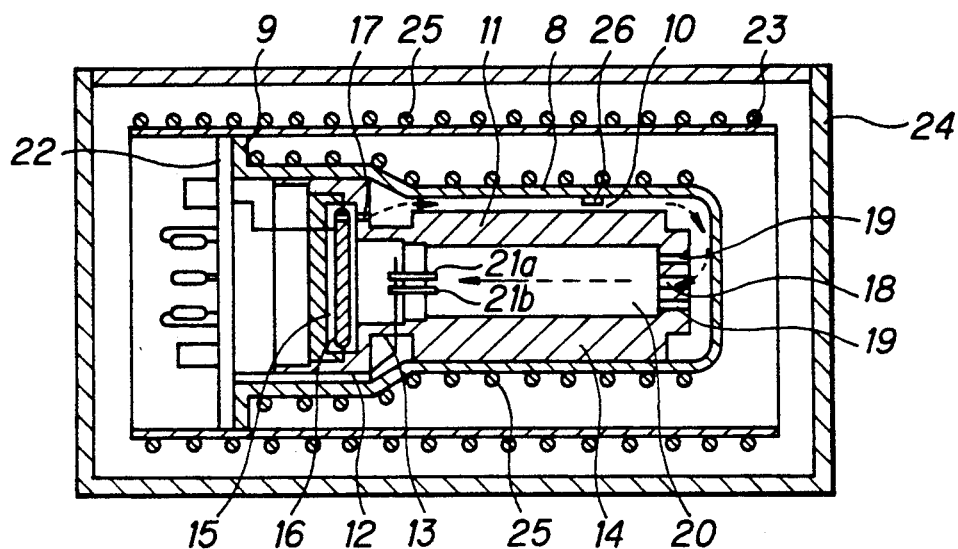
FIG. 2 is a plan view showing an example of construction of a gas flow type angular velocity sensor.

Referring now to the drawings, an embodiment of the present invention will be described in detail as follows:

FIG. 2 shows an example of a body construction of a gas flow type angular velocity sensor embodying the present invention.

In the drawings, 1 is a signal processing device, 2 is a sensor body, 3 is a heater driving circuit, 4 is a speed sensor, 5 is a non-volatile memory, 15 is a pumping chamber, 18 is a nozzle port, 21a, 21b are heat wires, 24 is a thermostat, 25 is a heating wire and 26 is a temperature sensing element.

As shown in FIG. 2, a casing 8 is a cylinder which has one closed end and the other open end with a flange 9. The casing 8 has three inwardly raised and lengthwise elongated strips evenly spaced from each other at its inner cylindrical surface to form a gas passage 10 in the axial direction between the raised strips and a body portion 11 abutting against the raised strips of the casing 8.

The body portion 11 placed in the casing 8 is composed of a holder 12, a neck portion 13 and a cylinder 14. The holder 12 serves to seal gas filled in the casing 8. A pumping chamber 15 is formed in the holder 12 to accommodate therein a diaphragm pump composed of piezo plate 16. By the action of this pump the gas is pumped into the gas passage 10 through a discharging hole 17.

The gas supplied into the gas passage 10 is forced to be injected in a laminar flow into a sensor room 20 formed in a cylindrical portion 14 through a nozzle hole and a plural number of gas flow rectifying holes 19 formed around the nozzle hole, and then it passes through a pair of heat wires in a front part of the sensor room and returns into the pumping chamber 15, wherefrom the gas is pumped out again into the gas passage 10 to repeat the above-mentioned circulation.

The flange 9 of the casing 8 supports a circuit board 22 whereon a resistance bridge circuit, an amplifier, an electric power supply circuit and so on are mounted. In FIG. 2, numeral 23 designates a supporting cylinder for supporting the sensor body.

Figure 3:
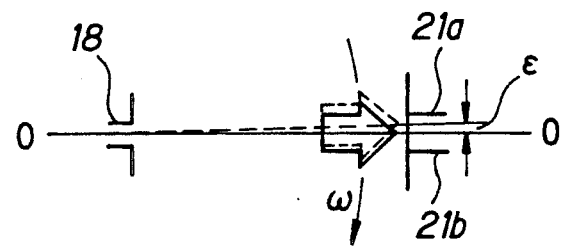
FIG. 3 shows a deflected state of a gas flow when an angular velocity is applied to the angular velocity sensor body.

As shown in FIG. 3, a pair of heat wires 21a and 21b are arranged symmetrically about axis line 0—0 of the nozzle hole 18. The gas injected into the gas passage through the nozzle hole 18 goes straight along the axis 0—0 to evenly attack the heat wires 21a and 21b giving even radiations to them while no lateral angular velocity "ω" is applied to the sensor body.

When a lateral angular velocity "ω" acts on the sensor body, the gas flow injected into the gas passage through the nozzle hole 18 is deflected to one side by an angle corresponding to the acting force as shown with a dotted line in FIG. 3, thereby an amount of deflection "ε" of the gas flow from the axis line 0—0 is produced at the place of the heat wires 21a and 21b and therefore the gas flow contacts much more with the heat wire 21a to produce a difference of the heat radiations given to the respective heat wires 21a and 21b.

A signal corresponding to a difference between temperature sensitive outputs of two heat wires 21a and 21b due to the radiation difference is taken out through the resistance bridge circuit (refer to FIG. 4) formed together with the paired heat wires 21a and 21b and the amplifier, and it is used for determining therefrom a direction and a magnitude of the angular velocity "ω" acting on the sensor body by its polarity and amplitude respectively.

A change in direction can be determined by integrating the detected values "ω" of angular velocity for the time of movement of the movable body.

Figure 4:
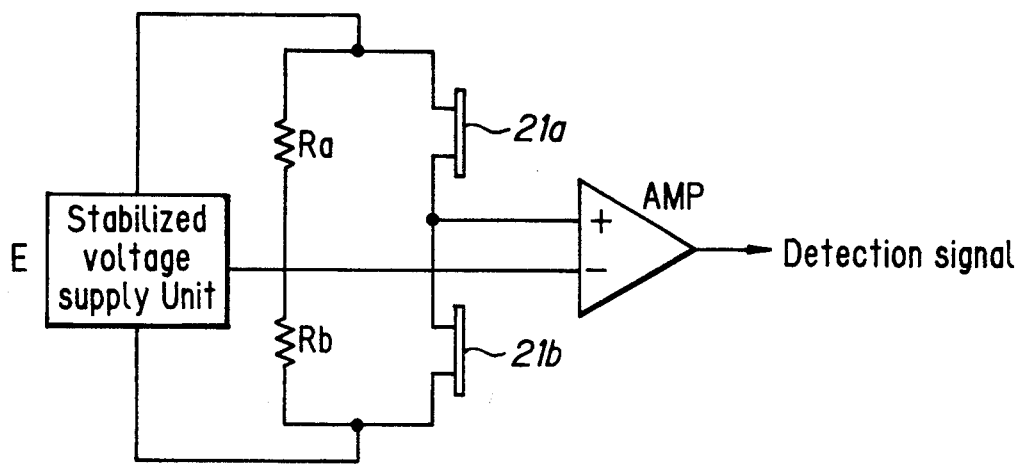
FIG. 4 shows an example of resistance bridge electric circuit consisting of a pair of heat wires.

FIG. 4 shows an example of a resistance bridge circuit comprising standard resistances "Ra" and "Rb" with known resistivity, a stabilized voltage supply unit "E" and an amplifier "AMP".

Figure 5:
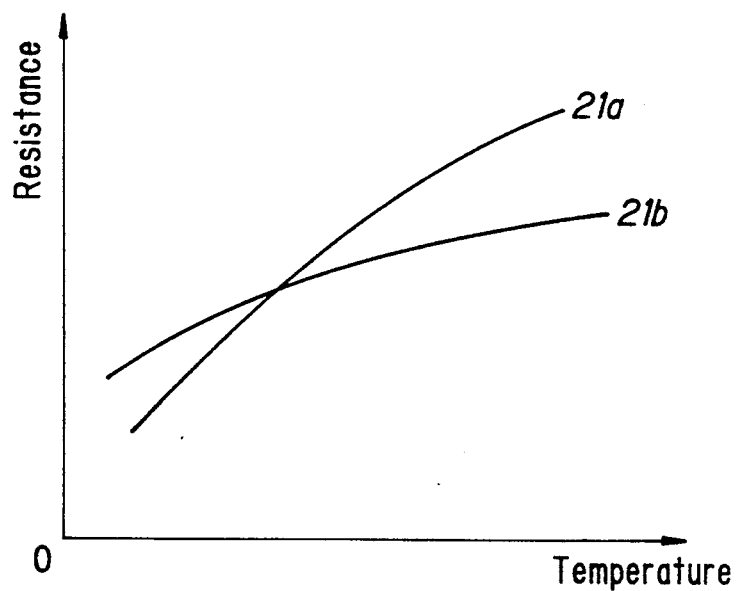
FIG. 5 shows an representative temperature-resistance characteristic of each of paired heat wires.

With this design of gas flow type angular velocity sensor, since it can be difficult to make a pair of heat wires 21a and 21b to be of the same resistance-temperature characteristic, the paired heat wires may have different characteristics as shown in FIG. 5. Accordingly, the bridge circuit may be unbalanced due to a change of temperature in the sensor body and/or ageing even with no angular velocity acting on the sensor body and thereby it produces an output causing an error included in an angular velocity detection signal.

To avoid this, as shown in FIG. 2, the sensor body is placed in a thermostat 24 and forcibly heated by heating wires 25 spirally wound around the casing 8 and the supporting cylinder 23 under such a temperature control that internal temperature of the sensor body detected by a temperature sensing element 26 is constantly maintained at the preset value.

The angular velocity sensor rewrites a new output into memory as an offset value at every time when the movable body stops and compensates its angular velocity detection signal outputted while the movable body moves by the use of the offset value stored in the memory.

By applying the above-mentioned offset compensating means it becomes possible to precisely detect an angular velocity "ω" as the movable body changes its moving direction without being effected by external temperature change and ageing.

The present angular velocity sensor also provides an offset compensation means. Since temperature characteristic of offset values for the period from the beginning of supplying the heating wires 25 with current to the time when the temperature in sensor body reaches the preset value is reproducible, the offset values variable with temperature while the movable body moves straight ahead or stops with no angular velocity acting on the sensor body are previously written in the table (memory) wherefrom the offset value corresponding to the temperature detected by the temperature sensing element 26 is read out to compensate the angular velocity detection signal outputted before the internal temperature of the angular velocity sensor body rises to the preset value.

Figure 7:
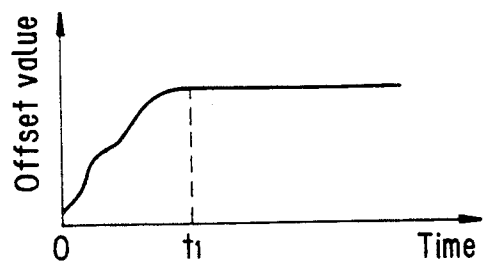
FIG. 7 shows a characteristic of an offset value depending on temperature rising in a sensor body.

FIG. 7 shows the characteristic of the signal offset as a function of time for rising temperature to the preset value.

Figure 8:
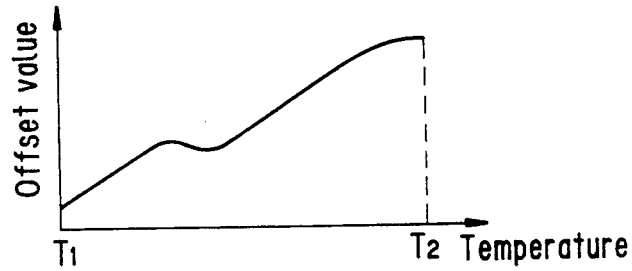
FIG. 8 shows an offset-temperature characteristic at the time of temperature rising.

FIG. 8 shows the characteristic of the signal offset as a function of temperature up to the preset value.

Consequently, the angular velocity sensor according to the present invention can precisely detect any angular velocity "ω" of the medium with a change in the direction of movement of the movable body for the period from the moment of starting the conduction of the heat wires to the moment of getting the temperature in the sensor body at the preset value by compensating for temperature and time-varying offset by the use of the table.

FIG. 1 shows an example of construction of an embodiment of the present invention.

In FIG. 1, a signal processing device 1 composed of a microcomputer, which, by reading therein a temperature detection signal T from the temperature sensing element 26 mounted in the angular velocity sensor body 2, generates a control signal CS to control a driving circuit 3 of the heating wires 25 so as to adjust the detected temperature to the preset value.

The signal processing device 1 also reads therein a speed detection signal "v" from a speed sensor 4 for detecting a moving speed of the movable body to detect whether the movable body moves or stops, and by reading therein a output signal T of the angular velocity sensor and a temperature detection signal T at the time of its stoppage makes the table of offset values and stores said table in a non-volatile memory 5.

At every time when the movable body stops after the internal temperature reaches the preset value the signal processing device 1 determines an offset value from the output signal T and rewrites the stored offset value with the obtained value in the memory 5.

Furthermore, the signal processing device 1 reads out of the table-memory 5 the offset value corresponding to the temperature detection signal T when the sensor body temperature is rising and also reads out the offset value after the temperature reaches the preset value. The processing device 1 generates an angular velocity signal T' compensated for the offset value by subtracting the offset value from the angular velocity detection signal T obtained from the angular velocity sensor body 1 when the movable body moves.

Figure 6:
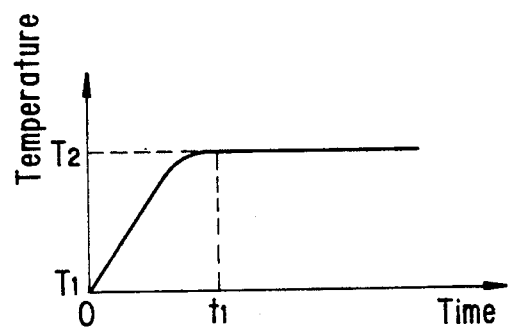
FIG. 6 shows a rising characteristic of an internal temperature of the sensor body.

The present invention also provides that since the offset value is stabilized with its gently sloping characteristic immediately before the internal temperature of the sensor body reaches to the preset value $T_2$ as shown in FIGS. 6 to 8, the temperature-varying offset data are gathered more frequently for a certain period just before sensor body obtains the preset temperature, so as to enrich the compensation table to be stored in the memory.

More practically speaking, in case of presetting the temperature $T_2$ at 70° C. the temperature-varying offset values is sampled at every 0.5° C. for the period of temperature rising up to 65° C. at a relatively sharp slope of the characteristic curve and at every 0.1° C. for the period of temperature rising over 65° C. to 70° C. at a gentle slope of characteristic curve.

Adoption of the above-mentioned means for making the compensation table makes it possible to carry out precise compensation for offset of the angular velocity sensor according to its practical temperature rising characteristic.

According to the present invention, such a provision is also made to allow the data processing device 1 to rewrite the table stored in the memory 5 with offset data newly obtained from outputs of the angular velocity sensor at temperatures detected by the temperature sensing element 26 when the movable body stops while the temperature rising to the preset value, thus assuring compensation for any change of the offset characteristics of the angular velocity sensor with time at corresponding temperatures.

If the stopping time of the movable body is so short to make sampling only in a limited range of temperature rising, the data processing device rewrites a corresponding part of the table.

To assure higher reliability of the data, said partial restoring is carried out in such a way that a given proportion of a difference between the preceding (stored) value and the newly obtained value is determined and is added to or subtracted from the newly obtained value and the calculation result is written as a new offset value in the table with erasing the preceding value at the same time.

In this case it is possible, for example, to obtain a mean value of preceding and present offset values and replace the preceding value with the mean value.

If the stopping time of the movable body is long enough to make data sampling over the full range of rising temperature, the data processing device unconditionally rewrites the table with the newly obtained data.

Application of the above-mentioned means for rewriting the table makes it possible to perform the offset compensation of angular detection signals T by the use of the continuously restored table without being affected by ageing of the angular velocity sensor.

When the angular velocity sensor having been in an unused state for a long time is operated, the offset values stored in the table may be very different from the present data due to the ageing of the angular velocity sensor.

Consequently, it is not preferable to directly change compensation values by the new offset value obtained at the first stop of the movable body after temperature in the angular velocity sensor body has reached the preset value. The compensation may be sharply changed by a large amount and the temperature is not yet stabilized at the moment just after the temperature has reached the preset value $T_2$ and therefore the offset value obtained at that time may be unstable.

Therefore, the present invention provides that the data processing device 1 makes the offset compensation of output signals of the angular velocity sensor by using the offset values set in the table at corresponding temperatures for a certain period (of about 30 seconds) necessary for stabilizing the temperature in the angular velocity sensor body at preset value $T_2$ after the last was obtained. The processing device 1 also makes compensation for a certain buffering period (e.g. of about 3 minutes) after completion of the period of rising temperature (that is, the stabilizing period elapsed) by using an offset value gradually variable with time which is calculated out from the offset values sampled at a given time interval (e.g. of 0.5 seconds) and the earlier offset values stored in the memory so as to ensure gradual reduction of differences between the preceding and the present values.

Figure 9:
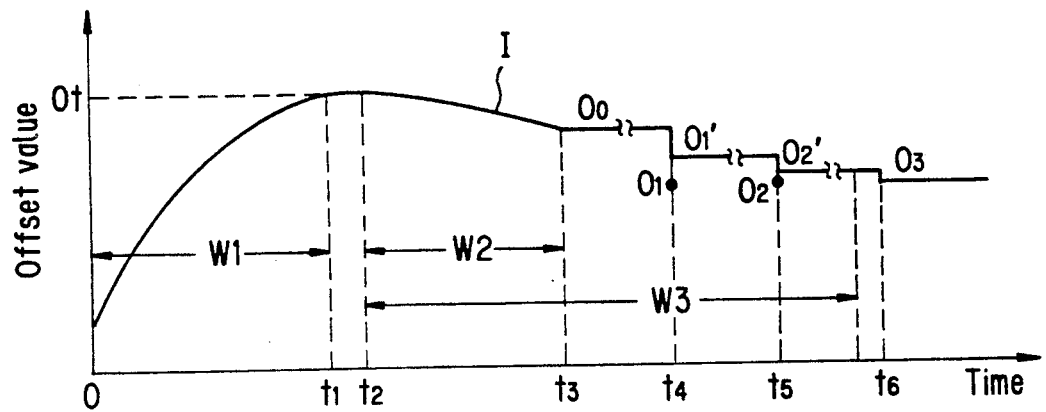
FIG. 9 shows a characteristic of offset changing state for a period from the beginning of temperature rising to the time of final stabilization of temperature at the preset value.

In the above-mentioned case a reduction rate of the difference between the newly obtained offset value Ot and the previously stored offset values Oo is increased at every sampling time so as to get a linear characteristic 1 of time-varying offset value as shown in FIG. 9.

In FIG. 9, t1 is a moment when the temperature reaches to the preset value, t2 is a moment of completion of the temperature rising operation, W1 is a period of the temperature rising and W2 is a buffering period.

When the offset value is completely changed over to the preceding offset value Ot at a moment t3, the compensation of signals obtainable thereafter is carried out by the use of said offset value Oo until the movable body stops next.

According to the present invention, for a certain period (of about 20 minutes) necessary for putting the angular velocity sensor into completely stabilized operation after the completion of the rising temperature period, the data processing device 1 performs the offset compensation by the use of a modified offset value. The modified offset value is calculated by adding or subtracting the given proportion of the difference between the present and preceding offset values to the present offset value obtained when the movable body is stopped. In this case the preceding value stored in the memory 5 is erased off at the time of writing the modified offset value. The proportion of the difference between the preceding and present offset values may be variable with time until the movable body stops.

For example, as shown in FIG. 9, when the movable body stops at the first time t4 during the period W3 necessary for bringing the angular velocity sensor into the completely stabilized operating state after completion of the rising temperature interval, a present offset value $O_1$ is obtained and 50% of the difference between the value $O_1$ and the preceding value $O_0$ is added thereto to obtain a modified offset value $O_1$, for which the angular velocity detection signal is compensated.

When the movable body stops next at an time t5, an offset value $O_2$ is obtained and, in view of a considerable time elapsed from the initial time, 20% of the difference between the value $O_2$ and the preceding offset value $O_0$ is added thereto to obtain a modified offset value $O_2$, to be used for compensation of the angular velocity detection signal.

When the movable body stops at a time t6 after the period W3, the data processing device 1 gets an offset value $O_3$ and, assuming that the angular velocity sensor operates in completely stabilized state and therefore the obtained offset value may be a finally stabilized one, it directly stores said offset value $O_3$ in the memory 5 and compensates the angular velocity detection signal for the offset value $O_3$ stored in the memory 5.

Consequently, according to the present invention, it is possible to smoothly change from the offset compensation during the rising temperature interval by the use of the table to the offset compensation by the use of the practical offset values obtainable at every time of the movable body stopping after completion of the rising temperature.

Figure 10:
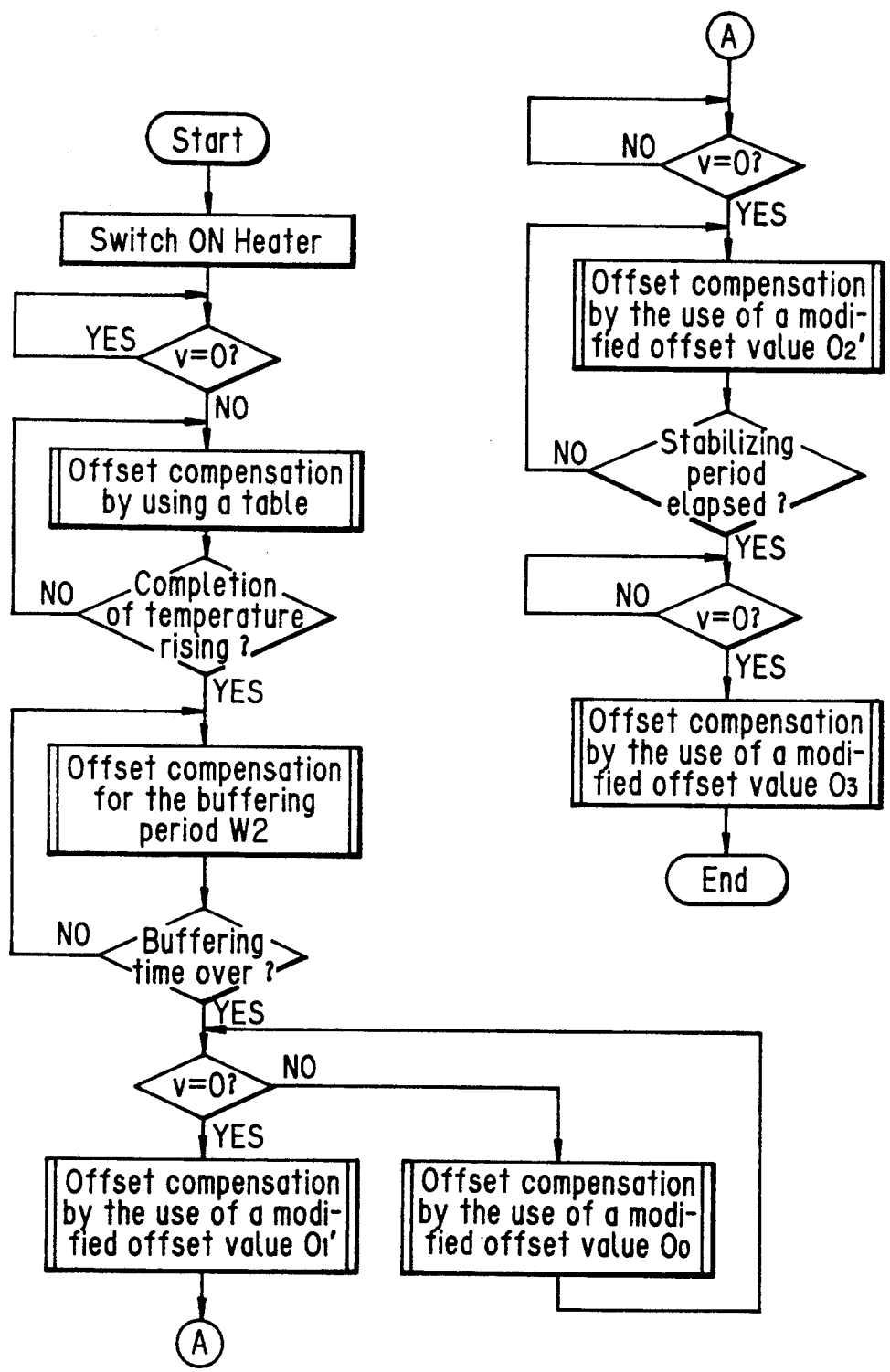
FIG. 10 is a flow chart showing a proceding process of offset compensation during a period from the initiation of temperature rising to the time of final stabilization of the temperature at the preset value.

FIG. 10 shows a flow chart of processing for offset compensation through the period from the rising temperature to the stabilized operation of the angular velocity sensor.

Since temperature in the sensor body can be controlled to be always at the preset value by the use of a heating means and an angular velocity detection signal can be precisely compensated for a temperature-varying offset (even for the period of temperature rising to the preset value) by the use of the table containing the offset data optimally set at corresponding temperatures, the angular velocity acting on the sensor body can be sensed with high accuracy from the time temperature in the sensor body begins to rise to the time it reaches the preset value.

Another advantage of the angular velocity sensor according to the present invention consists in that optimum offset values with due consideration of the possible time-varying characteristic of the sensor can be obtained, thereby the angular velocity detection signal can be precisely compensated for without being affected by the sensor's ageing.

What is claimed is:

1. A temperature compensation device for an angular velocity sensor having a sensor body for electrically detecting a deflection of gas flow by the use of paired temperature sensing elements resulting from an angular velocity acting on the sensor body, comprising:

a temperature control means for detecting an internal temperature of the sensor body by the use of a body temperature detector and for adjusting the internal temperature to a preset value;

an offset compensating means for obtaining an offset value from an output of the sensor with the sensor at the preset temperature and with no angular velocity acting thereon, for compensating an angular velocity detection signal obtained at the preset temperature in the sensor body; and temperature-varying means for reading-out an offset value from a table storing therein offset data in accordance with a temperature detected by the body temperature detector while the temperature in the angular velocity sensor is rising to the preset value and for compensating the angular velocity detection signal for the offset value obtained from the table.

2. The temperature compensation device of claim 1 characterized in that the offset data are more densely sampled in the temperature range immediately before the preset value.

3. The temperature compensation device of claim 1, further comprising means for obtaining offset values varying with temperature from the sensor's output while no angular velocity is acting on the sensor body and for rewriting the offset data of the table with the obtained offset values.

4. The temperature compensation device of claim 3, further comprising means for obtaining an offset value from an output of the angular velocity sensor in a temperature range while the temperature is rising with no angular velocity acting on the sensor body;

means for calculating a given proportion of a difference between the obtained offset value and the offset data in the same temperature range; and means for rewriting the value stored in the table by the value determined by adding or subtracting the given proportion of the difference to or from the obtained offset value.

5. The temperature compensation device of claim 1, characterized in that the sensor body is mounted on a mobile body and an offset value is obtained while the mobile body is stopped.

6. The temperature compensation device of claim 5, characterized in that the offset compensation when the temperature in the angular velocity sensor reaches the preset value is performed by using an offset value previously obtained at the preceding stop of the mobile body, and the subsequent offset compensation is performed by using an offset value determined in such a way that a given proportion of a difference between an offset value newly obtained at a subsequent stop of the mobile body is added to or subtracted from the previously obtained offset value.

7. A temperature compensation device for an angular velocity sensor having a sensor body, for electrically detecting a deflection of gas flow over a pair of heated wires, comprising:

a temperature adjuster for detecting the temperature of the sensor body and adjusting it to a preset value;

a steady state offset compensator for obtaining a steady state offset value from an output of the sensor when the sensor body is at the present temperature and with no angular velocity acting on the sensor, the steady state offset value used for compensating an angular velocity detection signal obtained with the sensor body at the preset value; and a temperature-varying offset compensator for reading-out a temperature-varying offset value from a table storing temperature-varying offset data in accordance with a temperature detected by the temperature adjuster, while the temperature in the sensor body is rising to the preset value, the temperature-varying offset value used for compensating the angular velocity detection signal obtained from the sensor during a time interval when the sensor body temperature has not reached the preset temperature.

* * * * *